(12) United States Patent
Trishaun

(10) Patent No.: US 10,942,266 B2
(45) Date of Patent: *Mar. 9, 2021

(54) SENSOR MODULE FOR DETERMINING RANGE INFORMATION AND RELATED SYSTEMS AND METHODS

(71) Applicant: HipScience, LLC, Winter Park, FL (US)

(72) Inventor: Marquette Trishaun, Winter Park, FL (US)

(73) Assignee: HIPSCIENCE, LLC, Winter Park, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/680,842

(22) Filed: Nov. 12, 2019

(65) Prior Publication Data

US 2020/0158854 A1 May 21, 2020

Related U.S. Application Data

(63) Continuation of application No. 15/459,671, filed on Mar. 15, 2017, now Pat. No. 10,591,593.

(Continued)

(51) Int. Cl.
*G01S 13/86* (2006.01)
*G01S 17/42* (2006.01)
(Continued)

(52) U.S. Cl.
CPC .......... *G01S 13/86* (2013.01); *G01C 19/5776* (2013.01); *G01P 3/00* (2013.01);
(Continued)

(58) Field of Classification Search
CPC ......... G05D 1/0088; G05D 2201/0213; G05D 2201/0203; G05D 1/0227; G05D 1/0231;
(Continued)

(56) References Cited

U.S. PATENT DOCUMENTS 4,589,610 A    5/1986    Schmidt
5,092,602 A    3/1992    Witler et al.
(Continued)

FOREIGN PATENT DOCUMENTS

EP    0694170 B1    2/2002
EP    1818687 A1    8/2007
WO    1992002832 A1    8/2007

OTHER PUBLICATIONS

Foxlin et al. "Constellation™: A Wide-Range Wireless Motion-Tracking System for Augmented Reality and Virtual Set Applications" Proceedings of SIGGRAPH 98 (Orlando, Florida, Jul. 19-24, 1998) Computer Graphics Proceedings, Annual Conference Series, ACM SIGGRAPH; pp. 8. ** See U.S. Appl. No. 15/459,671.

(Continued)

*Primary Examiner* — Olumide Ajibade Akonai
(74) *Attorney, Agent, or Firm* — Allen, Dyer, Doppelt + Gilchrist, PA

(57) ABSTRACT

A sensor module may include a housing having a front end, a rear end opposing the front end, and first and second opposing sides extending between the front end and the rear end. The housing may define a first opening and a second opening spaced apart from the first opening on the front end. The sensor module may include an IMU sensor carried by the housing, a wireless transmitter carried by the housing, a battery power supply carried by the housing, and an IR ranging circuit configured to sense range information for a target and having an IR transmitter aligned with the first opening and configured to emit an IR pulse, and an IR photodetector aligned with the second opening and configured to detect a reflected IR pulse. The wireless transmitter may be configured to transmit the range information to a remote location.

20 Claims, 12 Drawing Sheets

Related U.S. Application Data

(60) Provisional application No. 62/310,708, filed on Mar. 19, 2016.

(51) Int. Cl.
  *G01S 7/48* (2006.01)
  *G01P 3/00* (2006.01)
  *G01P 13/00* (2006.01)
  *G01C 19/5776* (2012.01)
  *G01S 13/42* (2006.01)

(52) U.S. Cl.
  CPC ............ *G01P 13/00* (2013.01); *G01S 7/4808* (2013.01); *G01S 13/42* (2013.01); *G01S 17/42* (2013.01)

(58) Field of Classification Search
  CPC ... G05D 1/0238; G01S 17/931; G01S 13/865; G01S 13/867; G01S 17/86; G01S 13/42; G01S 13/86; G01S 17/42; G01S 7/4808; G06K 9/00671; A47L 11/4061; A47L 2201/00; A47L 11/4011; A47L 2201/04; E04H 4/1654; B25J 9/1676; Y10S 901/01; A63F 13/213; G06T 17/00; G06T 19/003
  See application file for complete search history.

(56) References Cited

U.S. PATENT DOCUMENTS

| | | | |
|---|---|---|---|
| 5,525,967 A | 6/1996 | Azizi et al. | |
| 6,834,528 B2 | 12/2004 | Kappi et al. | |
| 6,845,323 B1 | 1/2005 | Beason et al. | |
| 6,898,971 B2 | 5/2005 | Dilz, Jr. | |
| 7,307,701 B2 | 12/2007 | Hoffman, II | |
| 7,592,909 B2 | 9/2009 | Zaruba et al. | |
| 7,672,781 B2 | 3/2010 | Churchill et al. | |
| 7,686,701 B2 | 3/2010 | Hasegawa | |
| 7,736,242 B2 | 6/2010 | Stites et al. | |
| 8,089,827 B2 | 1/2012 | Carotenuto | |
| 8,203,487 B2 | 6/2012 | Hol et al. | |
| 8,264,409 B2 | 9/2012 | Miller | |
| 8,279,412 B2 | 10/2012 | Motzer et al. | |
| 8,289,154 B2 | 10/2012 | Kodrin et al. | |
| 8,479,574 B2 | 7/2013 | Krylov et al. | |
| 8,953,570 B2 | 2/2015 | Lin et al. | |
| 9,182,494 B2 | 11/2015 | Vartanian et al. | |
| 9,501,044 B2 | 11/2016 | Jackson et al. | |
| 9,519,812 B2 | 12/2016 | Bassan-Eskenazi et al. | |
| 9,606,539 B1* | 3/2017 | Kentley | G08G 1/005 |
| 2001/0026240 A1 | 10/2001 | Neher | |
| 2003/0120425 A1 | 6/2003 | Stanley et al. | |
| 2004/0113778 A1 | 6/2004 | Script et al. | |
| 2006/0143645 A1 | 6/2006 | Vock et al. | |
| 2012/0236320 A1 | 9/2012 | Steffey et al. | |
| 2014/0275850 A1 | 9/2014 | Venkatraman et al. | |
| 2015/0094952 A1 | 4/2015 | Moeglein et al. | |
| 2015/0192656 A1 | 7/2015 | Werner et al. | |
| 2016/0171909 A1 | 6/2016 | Roozeboom et al. | |
| 2016/0183870 A1 | 6/2016 | Proud | |
| 2016/0295078 A1 | 10/2016 | Roozeboom et al. | |
| 2017/0132334 A1* | 5/2017 | Levinson | G06F 30/20 |
| 2017/0136631 A1* | 5/2017 | Li | B25J 19/005 |
| 2017/0176586 A1 | 6/2017 | Johnson et al. | |
| 2018/0000306 A1* | 1/2018 | Caruso | A47L 11/4066 |
| 2018/0143314 A1 | 5/2018 | Pelletier et al. | |

OTHER PUBLICATIONS

Roozeboom, Clifton, Pocketlab Voyager—Explore Science in Your World_ Retrieved from https://lwww.indiegogo.com/projects/pocketlab-voyager-explore-scien . . . , Dec. 16, 2016, retrieved on Feb. 22, 2017, 15 pages. ** See U.S. Appl. No. 15/459,671.

Force Motion—mantispenstem_ Retrieved from https://lwww.mantisopenstem.com/force-motion/, published Mar. 17, I>014, retrieved on Feb. 24, 2017, 2 pages.   See U.S. Appl. No. 15/459,671.

* cited by examiner

1

SENSOR MODULE FOR DETERMINING RANGE INFORMATION AND RELATED SYSTEMS AND METHODS

RELATED APPLICATIONS

This application is a continuation of U.S. application Ser. No. 15/459,671 filed on Mar. 15, 2017, which claims the benefit of priority to U.S. Provisional Application Ser. No. 62/310,708 filed Mar. 19, 2016, which is hereby incorporated herein in its entirety by reference.

TECHNICAL FIELD

This present disclosure is directed to the field of sensors, and more particularly to range sensors and related methods.

BACKGROUND

Many types of sensors generally use either sonar or IR (infrared) sensors positioned off object and rely on the system in motion to travel towards the sensor in a predetermined path of motion. Furthermore the 6 degrees of freedom based systems are encumbered by the gravity vector associated with the accelerometers and require sophisticated filters to address such issues. The prior art sensors are also generally encumbered by drift which in turn can be quite inaccurate where precision displacement information is needed as say in a physics classroom experiment. Since these sensors require careful placement, the setup for said experiments can be more cumbersome than the experiment itself.

SUMMARY

A primary objective of the present invention is to provide sensors, devices, systems, devices, and methods using wireless modular self-contained units with battery power supply that can use IR (infra-red) and/or radar, and/or ultrasonic measuring techniques and sensors for directional detection of impeding objects, persons, or moving targets, and can be used with mobile smart phones and the like.

A secondary objective of the present invention is to provide sensors, devices, systems, devices, and methods using wireless modular self-contained units with battery power supply that can use IR (infra-red) and/or radar, and/or ultrasonic measuring techniques and sensors, where upon the detection of the said target, algorithms make use of the direction, angle of ascent, and speed to provide real time position data represented in discrete format.

A third objective of the present invention is to provide sensors, devices, systems, devices, and methods using wireless modular self-contained units with battery power supply that can use IR (infra-red) and/or radar, and/or ultrasonic measuring techniques and sensors, where separate modular units each with multiple sensors to be positioned in strategic regions on the person or system of interest to study the said frame using the method of moments to dissect the object in varying degrees of granularity.

A fourth objective of the present invention is to provide sensors, devices, systems, devices, and methods using wireless modular self-contained units with battery power supply that can use IR (infra-red) and/or radar, and/or ultrasonic measuring techniques and sensors, where the wireless modular units can be used for real-time data acquisition along with seamless integration into an existing IMU only based system requiring information beyond six degrees of freedom as normally represented by gyros, and accelerometers.

A fifth objective of the present invention is to provide sensors, devices, systems, devices, and methods using wireless modular self-contained units with battery power supply that can use IR (infra-red) and/or radar, and/or ultrasonic measuring techniques and sensors, to allow the physics students or researcher the opportunity to deduce motion from both the integrals of acceleration, and the derivative of displacement vectors. In doing so we are providing the first sensor to allow for both features in a single unit.

The detection mechanism can also include Doppler information from a radar with a highly directional antenna or time-of-flight using an IR transmitter and receiver along with ultrasonic waves in certain embodiments. The sensors are collocated in an electronic assembly that can be affixed to the device-in-motion's frame of reference with the radar/light transceiver pointed along the axis of advancement. The sensor will contain said displacement mechanisms on each axis x, y, z and for 3 degrees of freedom displacement wise. The onboard accelerometer shall be used to resolve angle when motion becomes off axis. The sensor will be passive with regard to the body in motion meaning it shall not need to be tethered by physical wire to the data collection device.

The circuit card assembly that houses the printed wiring board (PWB) is physically dimensioned to be worn with comfort in an e-garment. The PWB shall contain all electronics for conversion of the radar and IR sensors, along with an inertial measurement sensor data for wireless transmission to the host person's mobile device. The circuit card assembly will combine the PWB, a coin/lipo battery, low-power processor, and piezo-vibrators.

The system is designed to maximize battery life by placing the sensors in a low-power mode until target excitations exceed a threshold invent on the sensor. Upon excitation, the sensor shall begin collecting data analyzing targets coming within proximity of the sensor. The software shall place the sensor back in the sleep mode when excitations cease over a specified time interval.

The wireless link shall support the Zigbee, Bluetooth, and ANT+ communication protocol. The chosen antenna and RF (radio frequency) substrate are fully compatible with all competing lower-power standards/communication radios.

The sensor software suite running on the host mobile device shall compute the sensor data for analysis per the desired outputs as specified by the end user.

The novel sensor unit can be housed in a portable housing having a generally disc shape with a front side having a raised upper semi-circular portion, and a lower recessed semi-circular portion, and a generally flat rear surface. The sensor unit can be fit into a novel holster having a narrow rectangular cavity for allowing the recessed semi-circular lower portion of the front of the sensor unit to be slipped inside. The holster can have upwardly protruding curved legs which can wrap about the curved sides of the generally disc shaped housing of the sensor unit.

Further objects and advantages of this invention will be apparent from the following detailed description of the presently preferred embodiments which are illustrated schematically in the accompanying drawings.

BRIEF DESCRIPTION OF THE DRAWINGS

FIG. 6A shows a screen shot of the motion displacement sensor data that can appear on a computer, smart phone, and the like.

DETAILED DESCRIPTION

Figure 1:
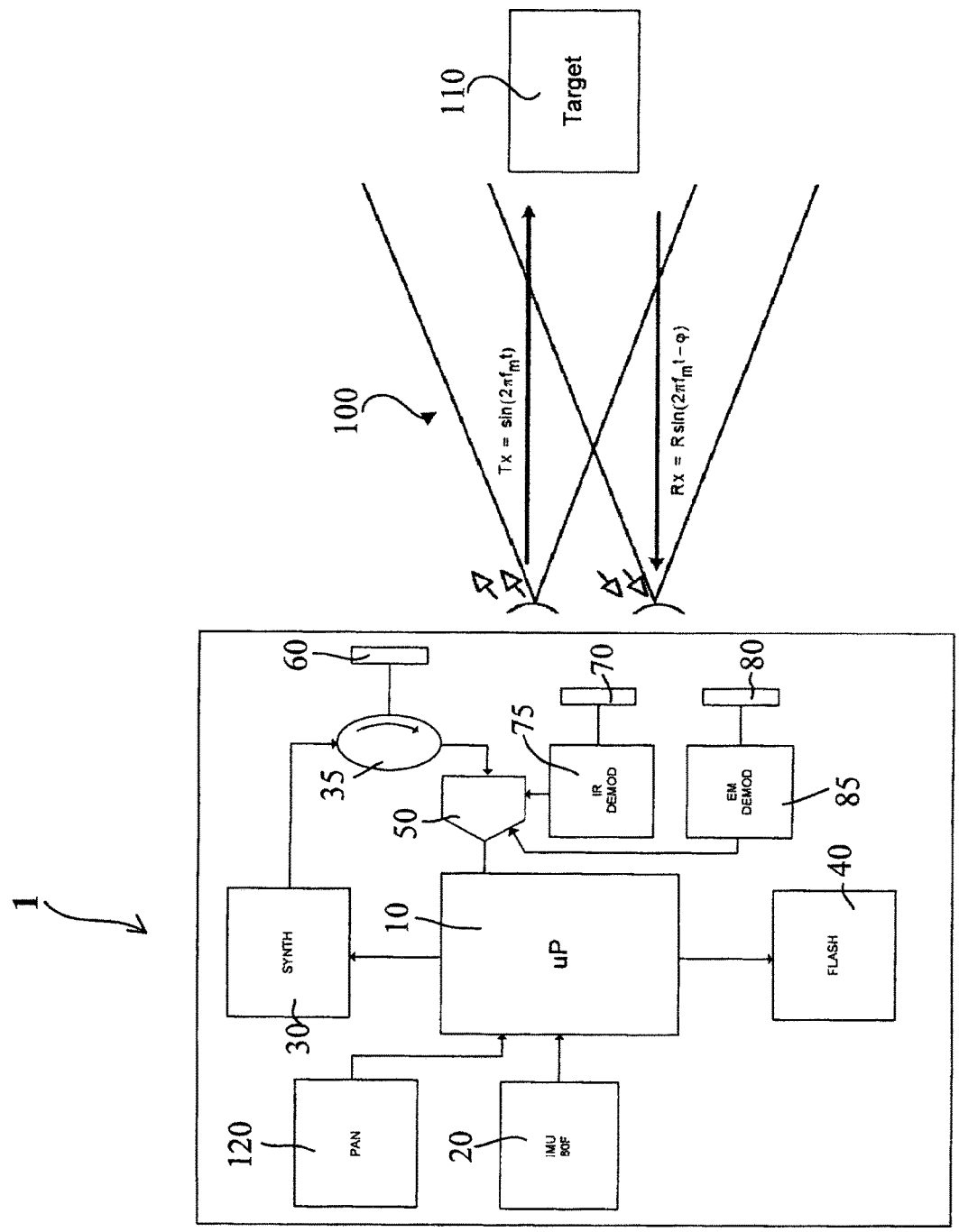
FIG. 1 shows the quadrature and phase transceiver circuitry used in a modular unit that exploits the time-of-flight of as in IR or electromagnetic waves in reference to a target.

The invention relates to sensors, and in particular to sensors, devices, systems, devices, and methods for providing wireless modular self-contained units with battery power supply that can use radar, ultrasonic, and IR measuring techniques and sensors for directional detection of impeding objects, persons, or moving targets, and can be used with mobile smart phones and the like. Upon the detection of the said target, algorithms make use of the direction, angle of ascent, and speed to provide real time position data represented in discrete format. Separate modular units each with multiple sensors to be positioned in strategic regions on the person or system of interest to study the said frame using the method of moments to dissect the object in varying degrees of granularity. The wireless modular units can be used for real-time data acquisition along with seamless integration into an existing IMU (inertial measuring unit) only based system requiring information beyond six degrees of freedom as normally represented by gyros, and accelerometers. The IMU can include a sensor that measures forces acting on a body in motion or at rest. In an automobile, an IMU would measure acceleration of the vehicle which is useful in engaging the cruise control system.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

1 modular self-contained sensor unit
10 microprocessor
20 IMU 60F inertial measurement unit with six degrees of freedom,
30 RF (radio frequency) synthesizer emits discrete sinewave tones. The incident wave is transmitted as electromagnetic waves that is both absorbed and reflected off of the target. The reflected waves are exploited for magnitude and phase.
35 refers to a circulator used as a reference signal
40 flash memory is an on board non-volatile memory that stores calibration and other user definable data that survives powering the device on/off.
50 refers to a quantizer (an analog to digital converter)
60 Radiating Element (antenna)
70 photo detector for transporting the electromagnetic waves through free space air.
75 IR (infrared) transceiver transmits and receives sinewaves as photonic light energy, with IR demodulator
80 antenna for electromagnetic waves
85 RF demodulator
100 transmitted and received echo waveform
110 target can be any surface that that beams come into contact with
200 spring mass system
210 mass
220 spring
230 anchor reference point
240 displacement
250 modular sensor unit
260 time of flight
270 surface
300 person to Person Situational Awareness Embodiment of a jogging person
310 sensor unit module
320 sensor unit module
330 sensor unit module
340 2D camera
345 mount surface
400 modular sensor unit and smart phone embodiment
405 circuit board
410 receiving information bandwidth
420 coin cell battery
430 chip antenna
440 smart phone
500 modular sensor unit housing
510 front side
512 Upper raised portion
514 stepped area
515 field of view
516 recessed bevel
520 IR indicator
530 charging port
540 on/off button
550 IR transmitter (one of the optical components)

560 IR photodetector (another one of the optical components)
570 rear side
575 fasteners, such as screws, bolts, and the like.
590 flat surface
580 battery indicator
600 screen shot
605 recorded displacement data
610 email
615 velocity graph
617 accelerometer data
700 track motion embodiment
710 sensor
720 moving cart
730 holster
732 left side curved leg
735 inside cavity of holster 730
738 right side curved leg
750 track FIG. 1 shows the quadrature and phase transceiver circuitry used in a modular unit 1 that exploits the time-of-flight of as in IR or electromagnetic waves in reference to a target 110. A general purpose microprocessor 10 can be used which is capable of performing essential DSP (digital signal processor) functions as related to time and frequency domain frequency processing.

The IMU (inertial measuring unit) 60F 20 can include but is not limited to an IMU used in U.S. Pat. No. 4,589,610 to Schmidt, which is incorporated by reference in its entirety. U.S. Pat. No. 4,589,610 to Schmidt describes an example of using an IMU to deduce motion in a guidance system. The subject invention is taking this IMU information and reporting it to the end user through an app so that children can learn about the motion of objects in free space. In order to get position data, Kalman filters can be applied and in doing so these are high quality estimates. We are adding the displacement sensor into the mix so that the missile or toy knows its absolute range to a target.

Other types of sensors can be used such as but not limited to radar and ultrasonic transducers, piezo-vibrators. and the like.

Referring to FIG. 1, the modular sensor unit 1 can be used for transmitting and receiving an echo waveform 110 off of a moving or stationary target 110. The sensor unit 1 combines a transceiver unit that emits and receives a radiated pulse as reflected from the target 110. The synthesizer 30 is responsible for producing discrete tones. The radiating element 60 can be an antenna for electromagnetic energy or an IR emitter of an optical system. In either case the transmitted signal is quantized 50 as the reference signal 35 to the time-of-flight 100 processing engine.

The received signal is processed using an antenna 80 for the electromagnetic wave where the received signal is demodulated using an RF demodulator 85. The received signal is processed using photodetector 70 for the photonic wave where the received signal is demodulated using an IR demodulator 75. This phase delta 100 is used to compute the distance to the target in the digital signal processing unit on the microprocessor 10. The inertial measurement data 20 (i.e. acceleration, and angular acceleration data) are combined in a vector form and stored on the on-board flash memory 40.

Three axis of acceleration, and three axes of angular acceleration results in six degrees of freedom (6OF). The processed sensor data is both stored on the flash 40 and transmitted in real time using a personal area network which can include Bluetooth, Wi-Fi, and other radio protocols providing truly untethered telemetry data.

Figure 2:
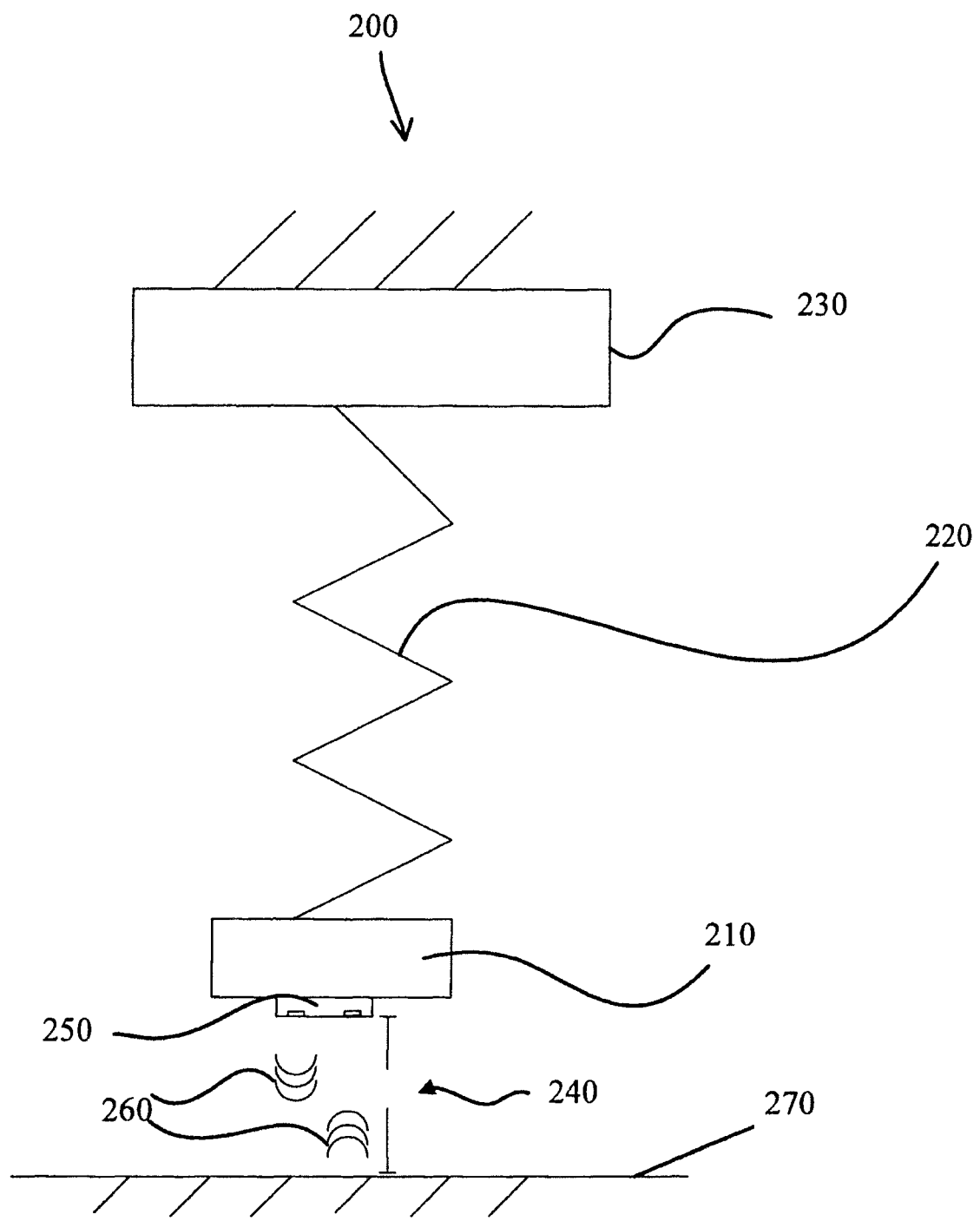
FIG. 2 shows an embodiment of the modular sensor unit observing motion from the point of reference of spring mass system in a classroom type experiment.

FIG. 2 shows an embodiment 200 of the modular sensor unit 250 observing motion from the point of reference of spring mass system in a classroom experiment. In the analysis of a spring mass system 200 affixed to a reference point 230 the sensor unit 250 can be attached to the mass 210 at the end of the spring 220. As the mass oscillates up and down due to the pull of gravity, the displacement 240 from floor 270 increases and decreases respectively. The sensor unit 250 measures this distance using the waves 260 transmitted and reflected from the floor 270 and at the same time records and stores the linear and angular acceleration data for the user observing the experiment.

Figure 3:
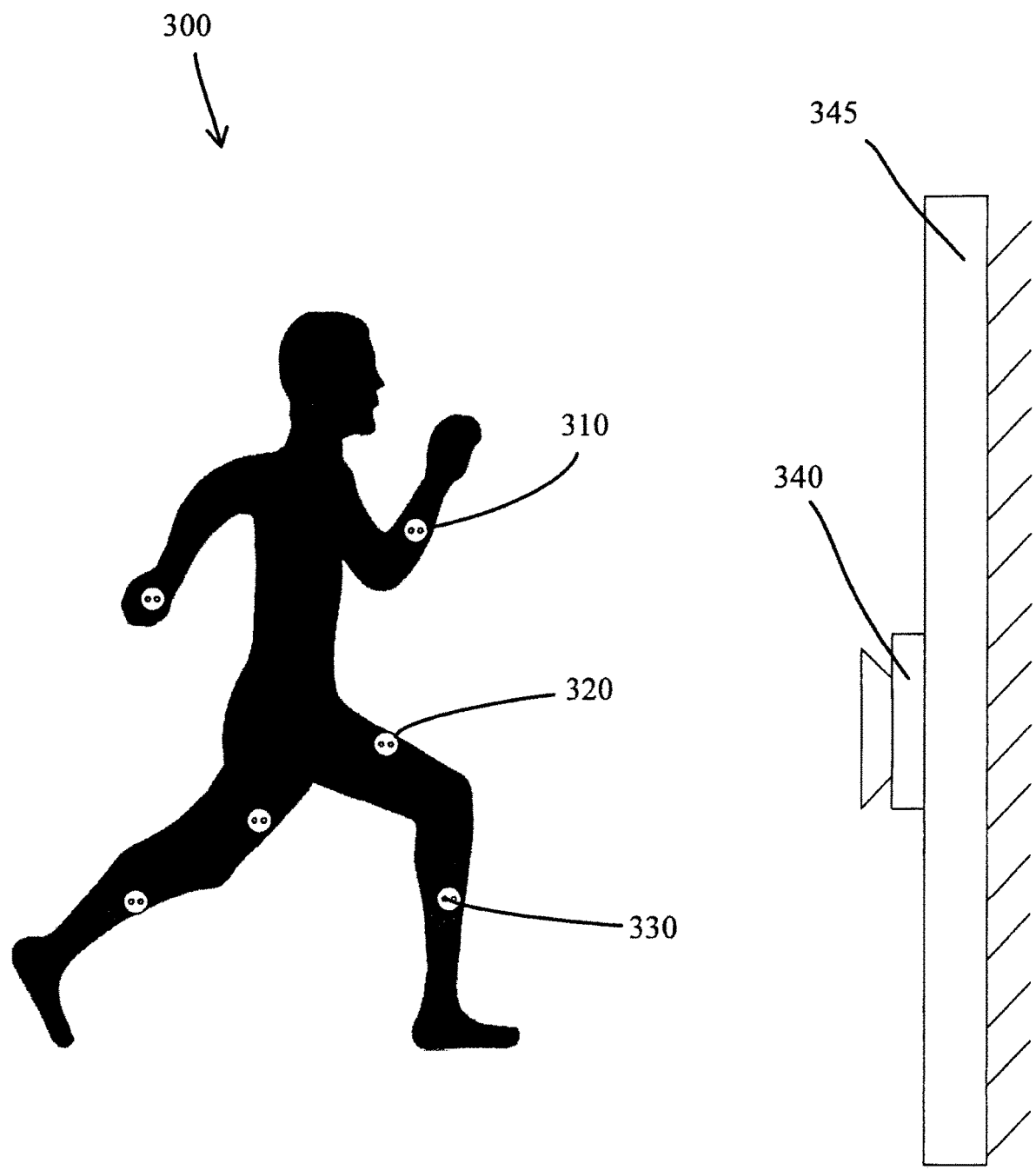
FIG. 3 shows another embodiment of using multiple modular sensor units located at different location points in front of a 2D (two dimensional) camera.

FIG. 3 shows another embodiment of for a person to person situational Awareness application 300 of using multiple modular sensor units 310, 320, 330, and more located at different location points of a moving body in front of a 2D (two dimensional) camera 340 on a support mount surface 345.

Take the case of an athlete 300 shadow performing in front of a wall 345. In some cases, a 2-D camera 340 can be mounted as a secondary aid in training for performance and power by monitoring technique. Multiple sensors 310, 320, and 330 can be placed at key places of motion along the body 300 can relay said information back to a host mobile device (FIG. 4) to combine the sensor data into a personal area network.

A personal area network (PAN) is the interconnection of information technology devices within the range of an individual person, typically within a range of 10 meters. Transmitting data wireless over a short distance. Bluetooth and Wi-Fi Direct are examples of personal area networks (PANs).

The distance of each sensor 310, 320, and 330 as measured with respect to the wall 345 can be combined to analyze a sprinter's running motion on a treadmill by correlating the runners arm stride 310 with their quad explosion 320 to determine if they are overcompensating for weak lower leg muscles 330.

The sensor units 310, 320, 330 can provide depth from the camera 340 to make for three-dimensional data points for motion tracking of the individual points on the subject of interest. The information can be used for tracking during animation to provide ultra-realistic modeling of the person in a computer animation.

Figure 4:
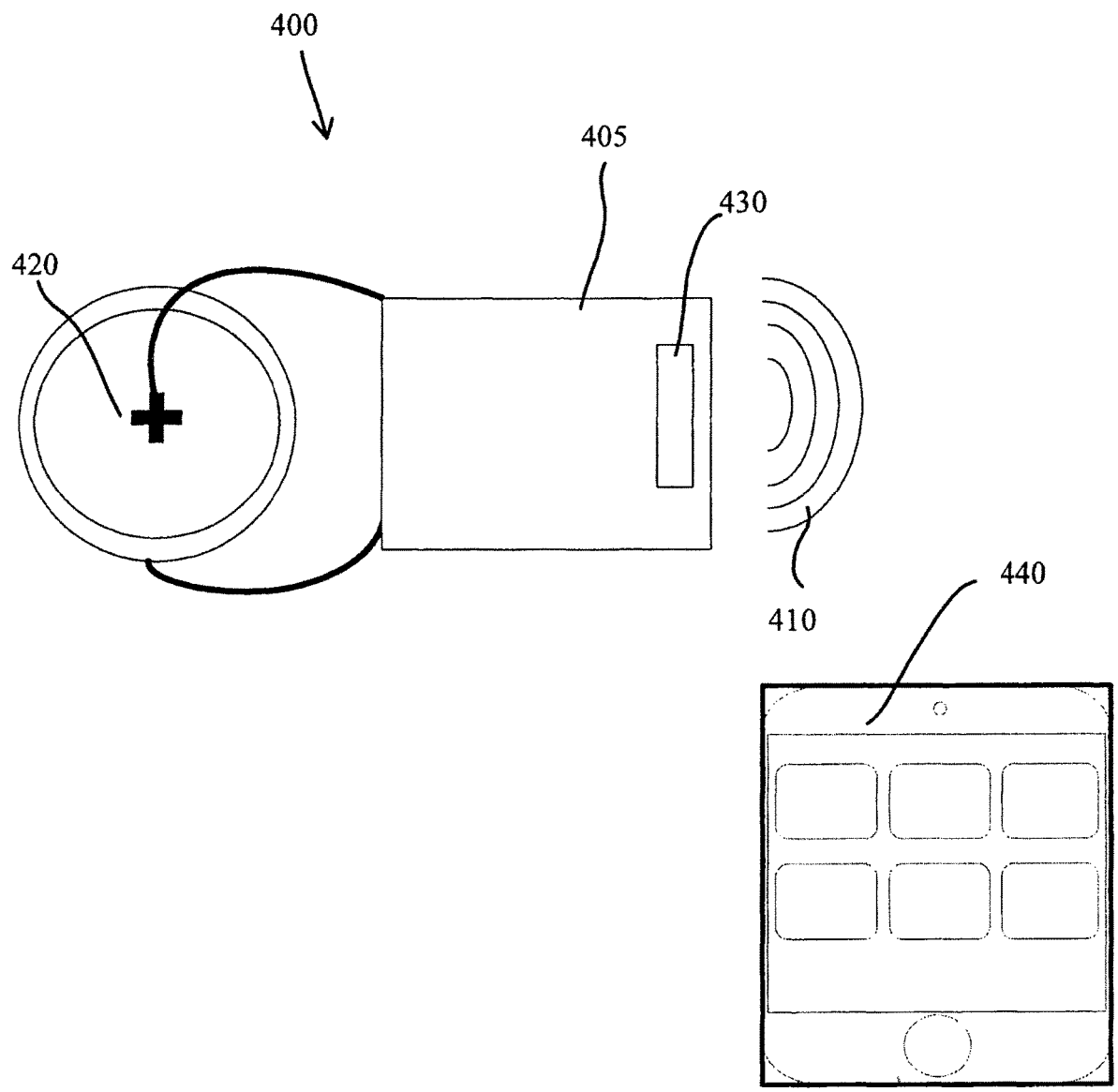
FIG. 4 shows a battery operated modular sensor unit spaced apart and in wireless communication with a mobile computing device, such as a smart phone.

FIG. 4 shows an embodiment 400 of battery operated modular sensor unit (such as the previously shown and described sensor units) spaced apart and in wireless communication with a mobile computing device 440, such as a smart phone, portable computer, and the like.

The electronic circuit assembly 400 part of sensor unit 1 is responsible for housing circuit board 405 along with chip antenna 430 for transmitting and receiving information 410 from the smart phone or mobile computing device 440. The said unit is low energy device capable of running for extended periods of time off of a single coin cell 420.

The sensor unit 400 is not a throw-away device upon depletion of the coin-cell battery 420. The chip antenna 430 can be low profile in design and collocated with the rest of sensor electronics using an RF (radio frequency) substrate on the top side of the PWB.

The advantage of such design is that there are no additional mechanisms to connect to the bicycle that might suffer damage due the normal rigors of an e-garment. The bandwidth 410 of the chip antenna 430 is commensurate with the low-power radio already utilized in industry standard smartphones, so the smartphone 440 does not require any special adapters to communicate.

Figure 5A:
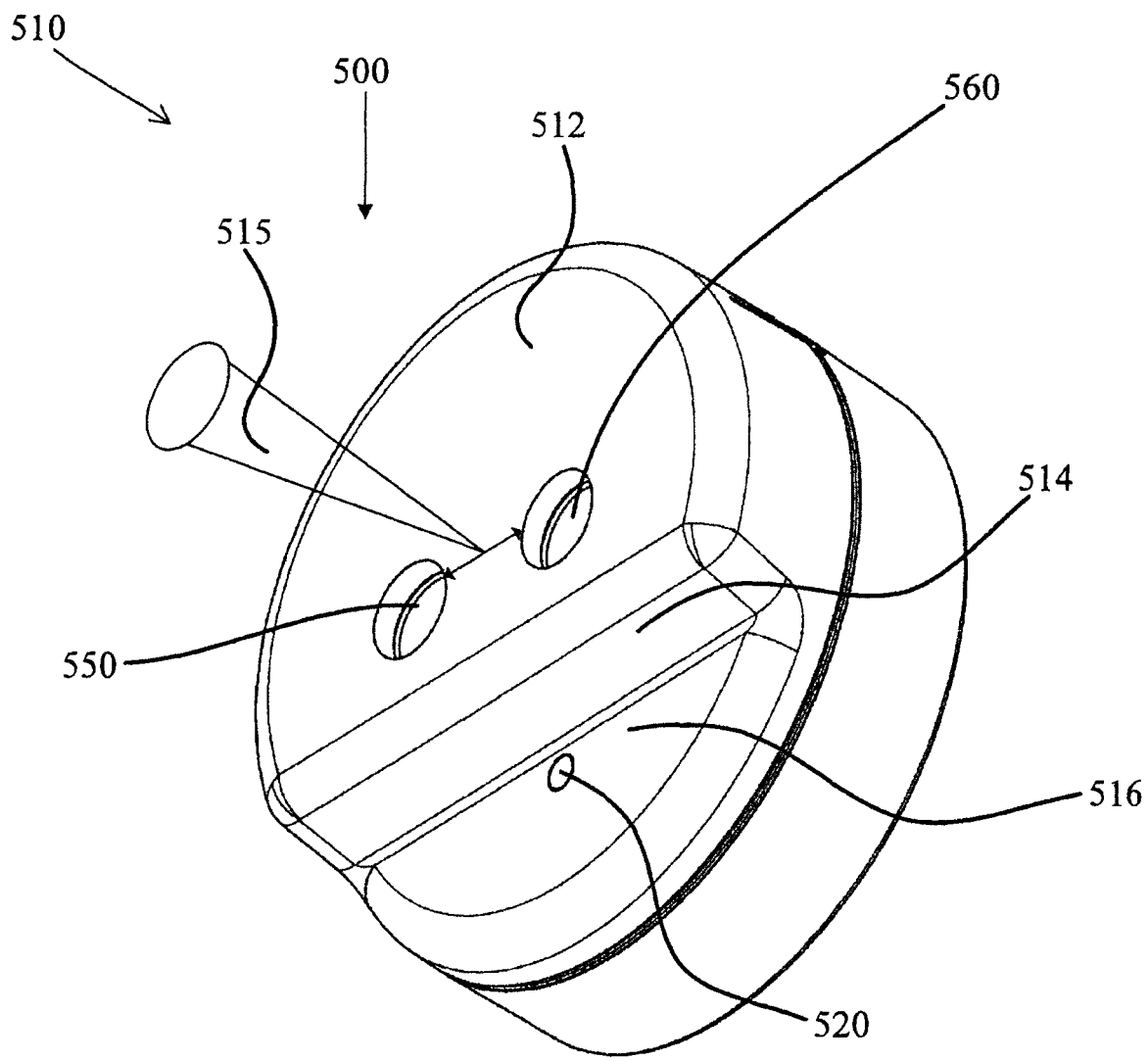
FIG. 5A is an upper left front view of the modular sensor unit referenced in the previous figures.

FIG. 5A is an upper left front view of the modular sensor unit 500 in a mechanical housing having a generally disc shape up to approximately a few to several inches in both diameter and thickness, which can house the components that were referenced in the previous figures. FIG. 5A is a front side of the modular unit 500. The mechanical enclosure 500 for the sensor unit 1 FIG. 1) is responsible for housing circuit board 405 (FIG. 4) along with the sensor optics, previously described. The field of view 515 is determined by the spacing between the optical elements 550, 560 positioned behind a pair of circular openings in the front of the housing, and is intentionally tight for a direct and long extending beam. This both increases range and sensitivity of the sensor distance.

Figure 7A:
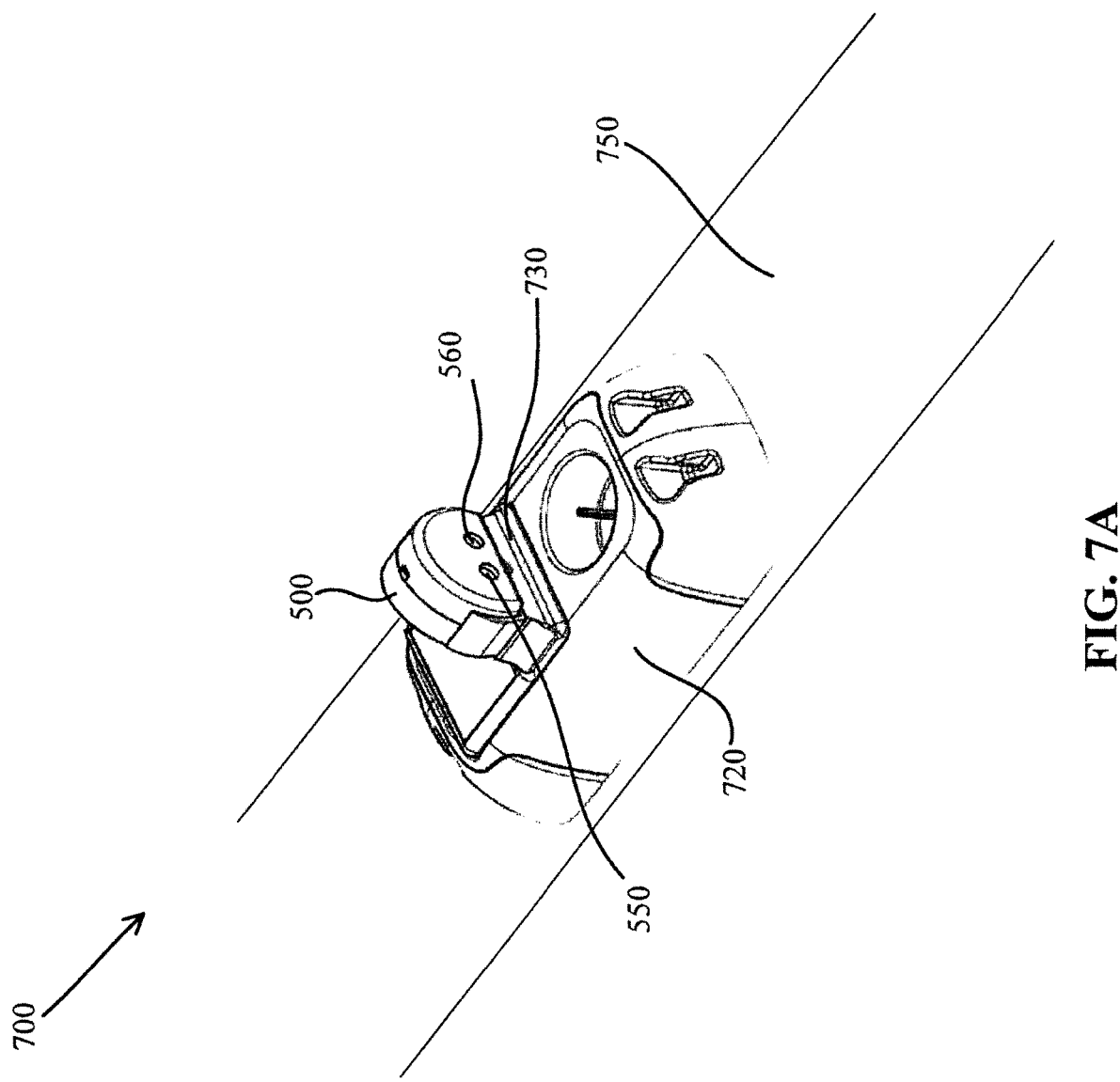
FIG. 7A shows a sensor in an embodiment on a track measuring motion data on a track.
Figure 7B:
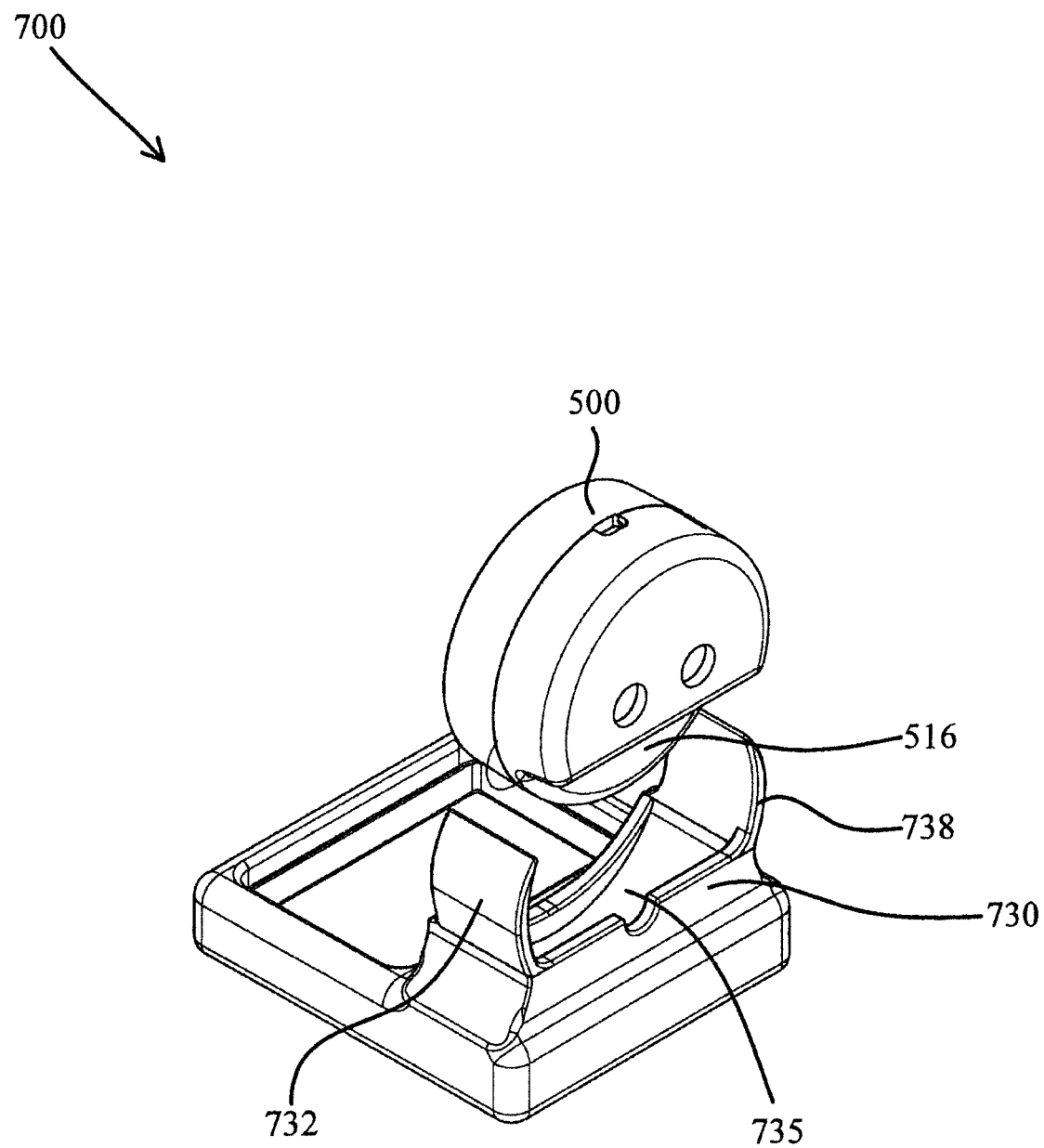
FIG. 7B is an exploded view of the sensor unit and holster shown in FIG. 7A.

Under an outwardly extending upper portion 512 there stepped area 514 leading to a recessed bevel 516 for mounting the sensor unit 500 in a motion cart enclosure 730 shown and described in relation to FIGS. 7A-7B. The IR indicator 520 alerts the user with a visible light emission as to when the unit 500 is transmitting IR pulses to calculate range.

Figure 5B:
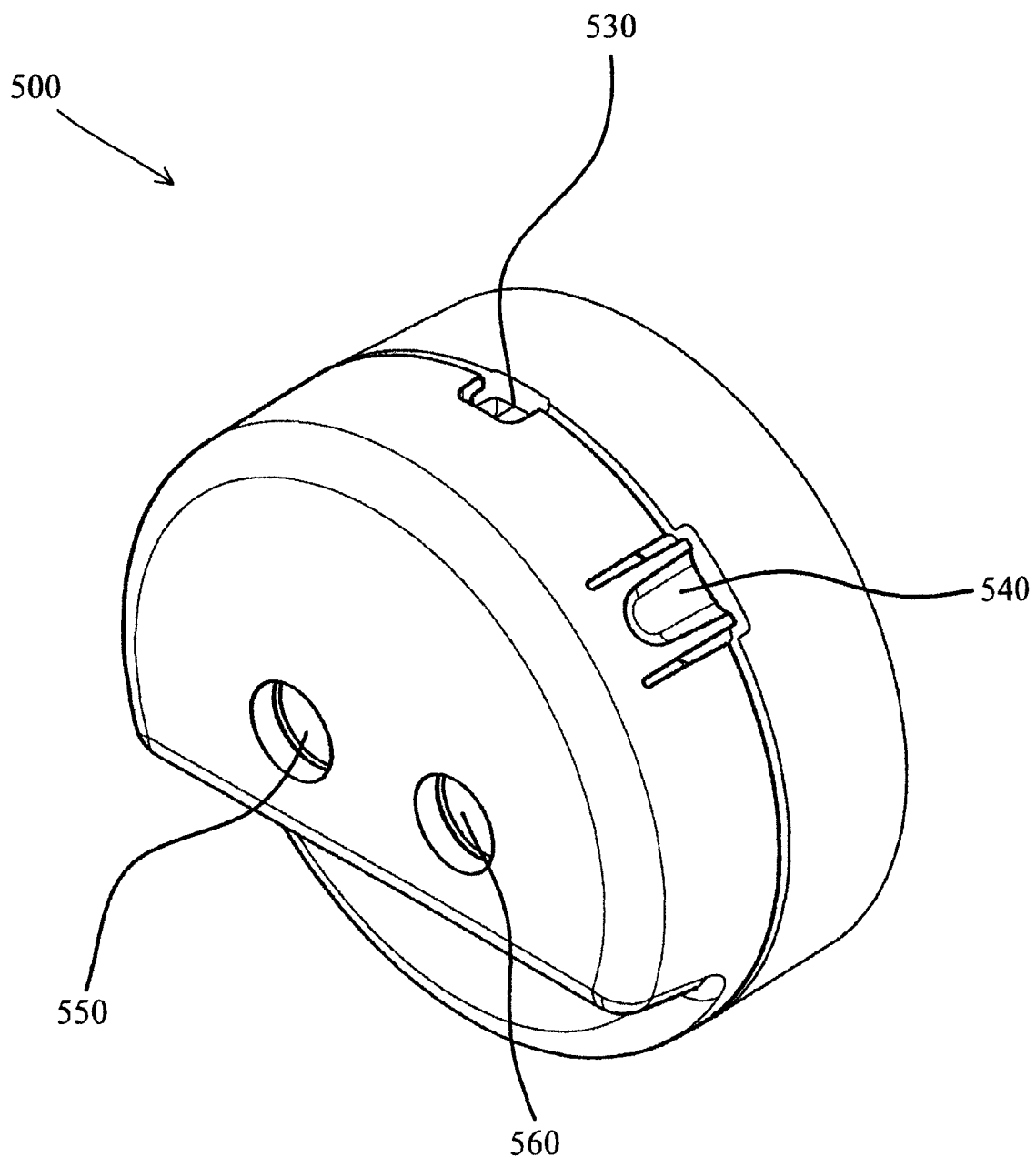
FIG. 5B is an upper right front view of the modular sensor unit of FIG. 5A.

FIG. 5B is an upper right front view of the modular sensor unit 500 of FIG. 5A. The sensor unit 500 contains a charging port 530 which accepts a standard USB cable. The on/off button 540 is recessed to not inadvertently power the sensor off while concealed in an object that might absorb shock (i.e. nerf football). The IR transmitter 550 emits an IR pulse that is detected by the IR photodetector 560 which contains a filter to lessen sensitivity to ambient light again improving sensor range.

Figure 5C:
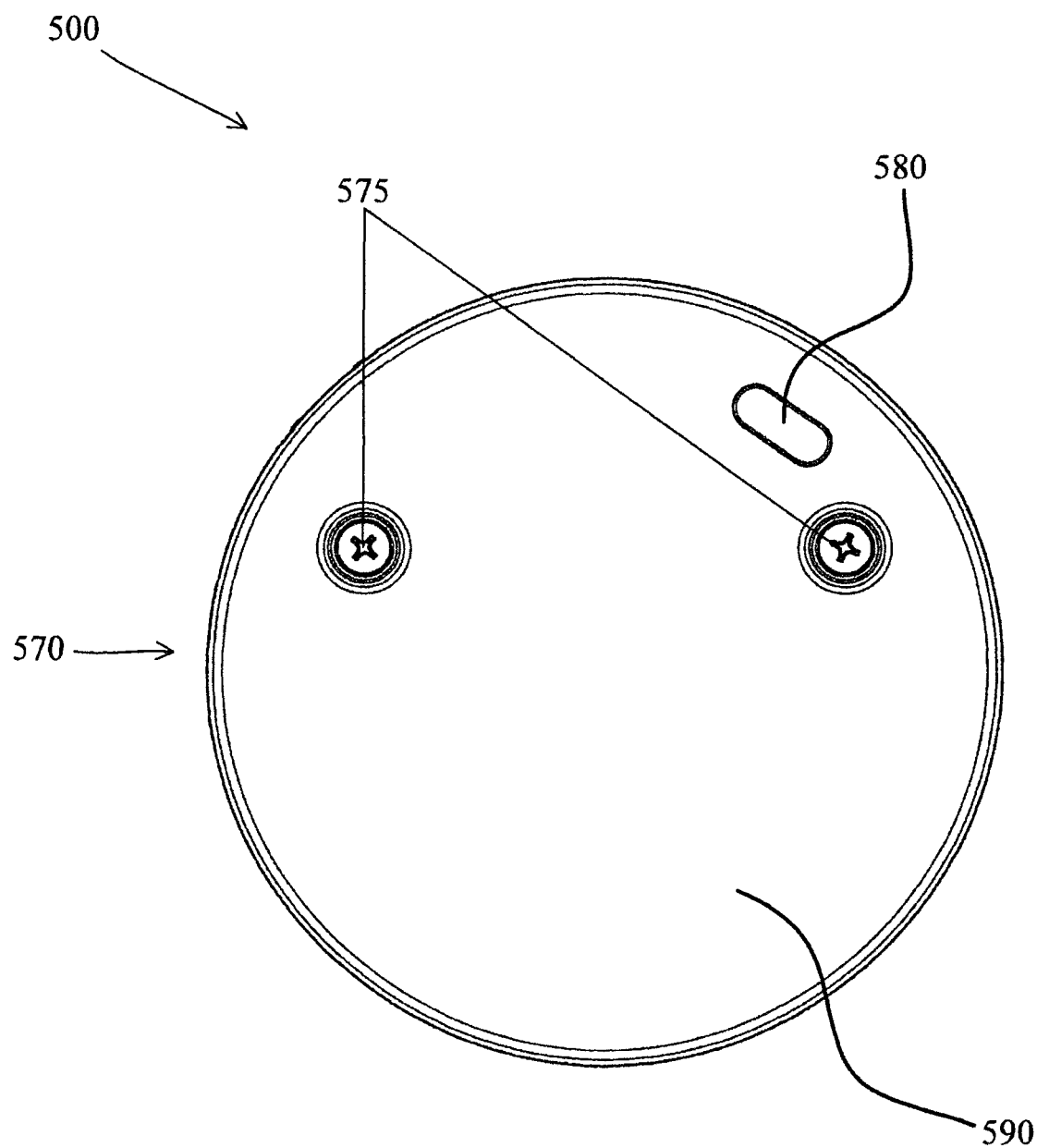
FIG. 5C is a rear view of the modular sensor unit of FIG. 5A.

FIG. 5C is a rear view of the front view of the modular sensor unit 500 of FIG. 5A. Other than the mechanical fasteners 575 the sensor is flat 590 so that it may be adhered to objects with any mounting technique, such as but not limited to peel and stick tape, hook and loop fasteners, other adhesives, and the like. There are two indicators 580 to indicate when the sensor has completed charging and when in use, if the battery is critically low. For example, a solid color, such as green can indicate the unit is being charged, and a flashing red color can indicate the unit is running low on battery life.

The sensor unit 500 can be used to corroborate inertial measurement data with the displacement information for 7 degrees of freedom in motion analysis. The sensor unit 500 can be modular for user specific regions of motion observation for a combinatorial motion map of said targets of interest.

The sensor unit 500 reports said information in multiple data outputs for digital realization using smart devices and other mobile computing platforms.

The wireless modular sensor units 500 can be used for real-time data acquisition along with seamless integration into an existing IMU only based system requiring information beyond six degrees of freedom as normally represented by gyros, and accelerometers.

The sensor units 500 used in the novel system are designed to maximize battery life by placing the sensors in a low-power mode until target excitations exceed a threshold invent on the sensor. Upon excitation, the sensor shall begin collecting data analyzing targets coming within proximity of the sensor. The software shall place the sensor back in the sleep mode when excitations cease over a specified time interval.

The wireless link shall support the Wi-Fi, Zigbee, Bluetooth, and ANT+ communication protocol. The chosen antenna and RF (radio frequency) substrate are fully compatible with all competing lower-power standards/communication radios.

The sensor unit 500 can use software running on the host mobile device shall compute the sensor data for analysis per the desired outputs as specified by the end user to include useful information in physics lab experiments like displacement graphs, acceleration graphs, and range plots etc.

Figure 6A:
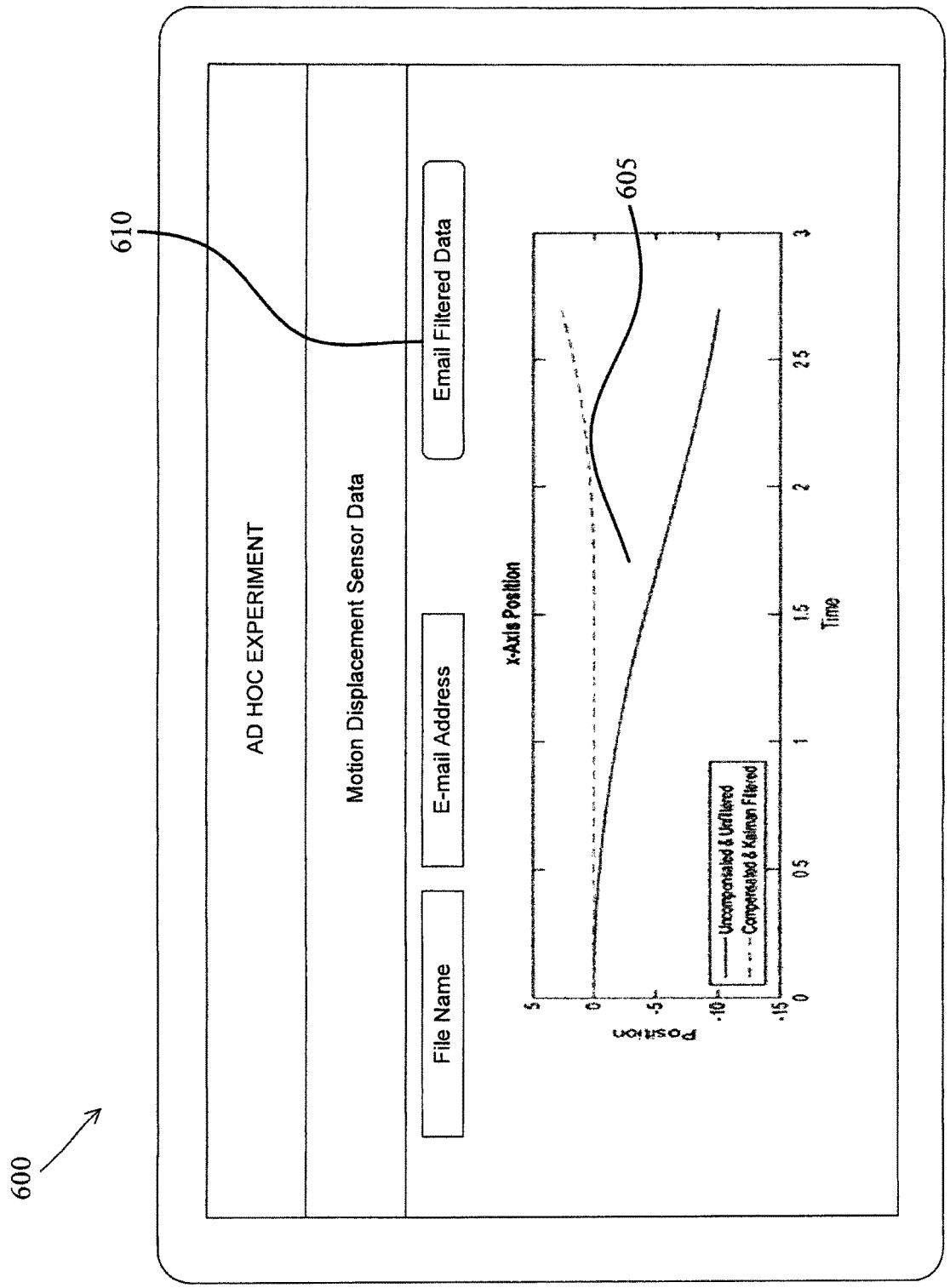
Figure 6B:
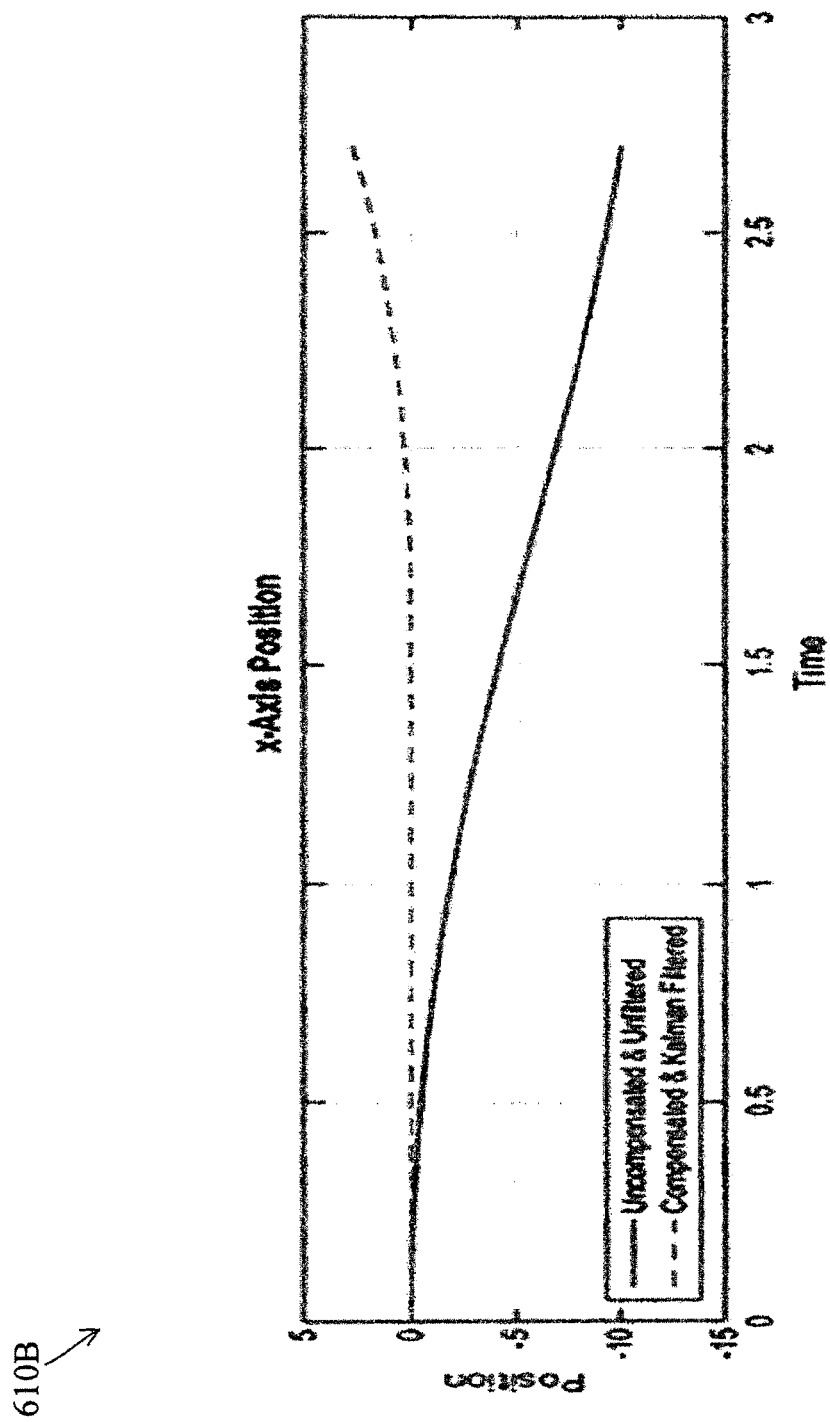
FIGS. 6B and 6C show graphs of application data for a user to download and record in a physics notebook.

FIG. 6A shows a screen shot 600 of motion displacement sensor data that can be displayed on portable computers, smartphones, and the like. The recorded displacement data 605 gathered by the sensor in real-time can be e-mailed 610 to the end-user or stored on the cloud in networked classrooms. If the user chooses they can simply observe live motion by holding the sensor in their hands or setting off an experiment while visually watching the displacement data. FIG. 6B shows a graph 610B of x-Axis Position data shown in the screen shot 600 of FIG. 6A.

Figure 6C:
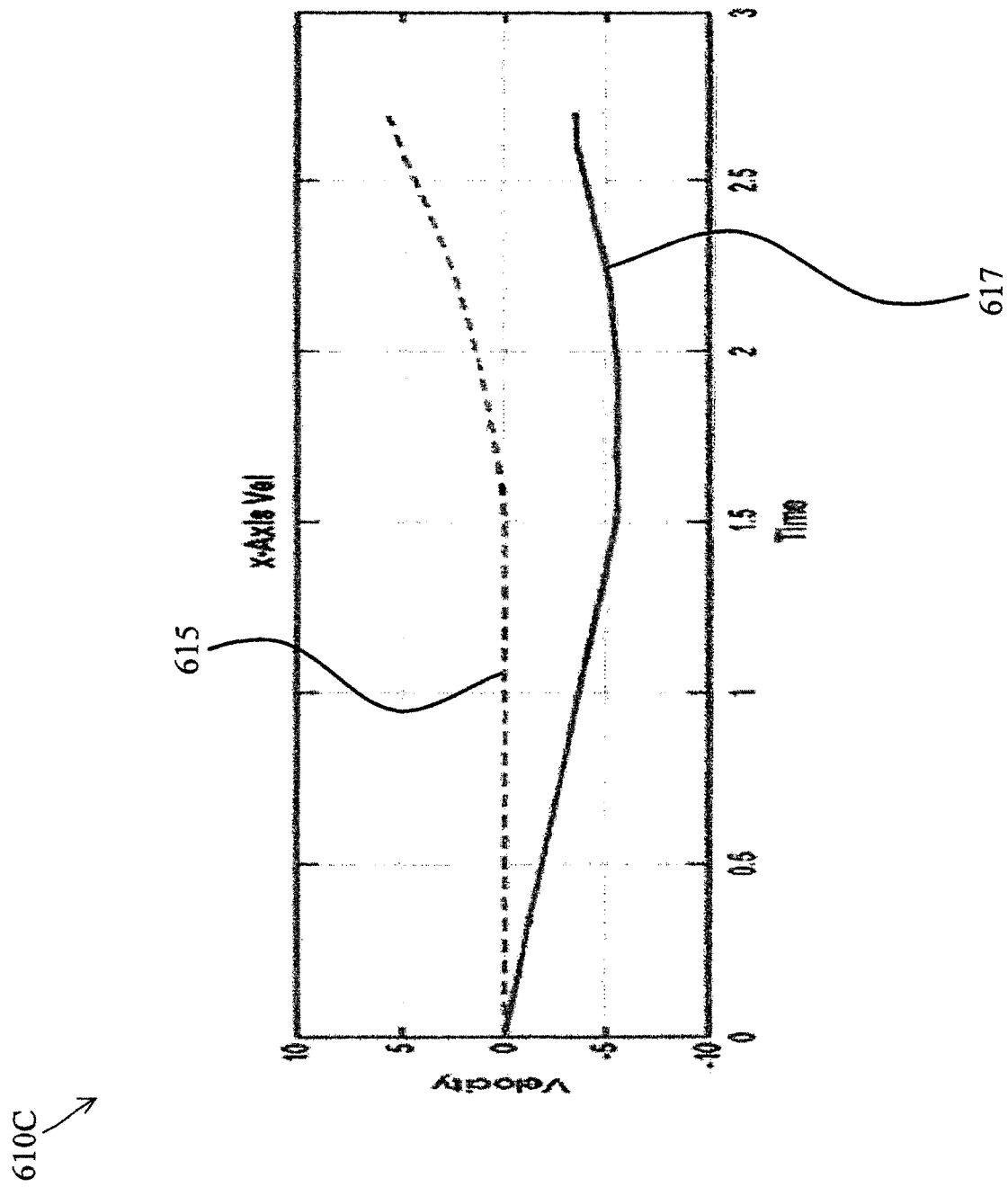

FIG. 6C is a graph 610C of x-Axis Velocity data that can also come from the screen shot 600 of FIG. 6A. By taking the derivative of the displacement data the physics student can trace the velocity graph 615 along the objects path of motion. This is a derived plot from the displacement data recorded by the sensor. It should also be noted that the on-board accelerometers are also recording motion. The physics students can produce this same graph with the integral of the accelerometer data 617. They will note a cleaner profile without the aid of the filters on the displacement plots because it doesn't suffer the effects of the gravity vector. No other physics sensor provides both acceleration and displacement in a single unit.

FIG. 7A shows an embodiment 700 of using the novel sensor unit 500 mounted in a holster 730. The motion of a cart down a track is one popular physics experiment 700. The cart 720 is allowed to accelerate down the track 750. Most competing systems use an ultrasonic sensor at the end of the track to record the displacement. With our system, we record the motion from the perspective of the cart 720 as it accelerates down the track. The sensor 500 is affixed to our motion cart using our dedicated holster 730 which is designed to both absorb vibration and to not block the radiating element 550 and the receiving element 560 during the motion down the track 750.

FIG. 7B is an exploded view of the novel modular sensor unit 500 removed from the mounting holster 730. To start an experiment, the pliable and bendable curved legs 732, 738 can bend outward as the unit 500 is pushed down into the holster 730, and snap back to wrap about the curved sides of the sensor unit 500 as the recessed bevel portion 516 of the unit 500 is sized so as to slip into the cavity portion 735 of the holster. When the experiment is done the sensor 500 can be popped out from the holster 730 and ready for use in a different experiment. The novel holster can be used to mount the sensor unit 500 to any surface. The underside of the novel holster 500 can be adhered to any surface by various types of fastening techniques that can include but are not limited to hook and loop fasteners, peel and stick tape, and any other types of fasteners, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications That which is claimed is:

1. A sensor module comprising:
a housing comprising a front end, a rear end opposing said front end, and first and second opposing sides extending between said front end and said rear end;
said housing defining a first opening and a second opening spaced apart from said first opening on said front end;
an inertial measurement unit (IMU) sensor carried by the housing;
a wireless transmitter carried by the housing;
a battery power supply carried by the housing; and
an infrared (IR) ranging circuit configured to sense range information for a target and comprising an IR transmitter aligned with the first opening and configured to emit an IR pulse, and an IR photodetector aligned with the second opening and configured to detect a reflected IR pulse;
said wireless transmitter configured to transmit the range information to a remote location.

2. The sensor module of claim 1, wherein said IR ranging circuit is configured to determine the range information based upon time of flight calculations.

3. The sensor module of claim 1, wherein a mobile wireless communications device spaced apart from the sensor module is for receiving data from the sensor module.

4. The sensor module of claim 1, wherein said IR ranging circuit includes a plurality of sensors configured to measure speed and direction from the target.

5. The sensor module of claim 1, wherein said IMU sensor is configured to provide 3-axis gyroscope values and 3-axis acceleration values; and wherein said IR ranging circuit cooperates with said IMU sensor to provide the range information to define 7 degrees of freedom in motion analysis.

6. The sensor module of claim 1, wherein said front end comprising an upper portion, and a lower portion; and wherein said lower portion is recessed with respect to said upper portion.

7. The sensor module of claim 6, wherein said rear end is circle-shaped.

8. The sensor module of claim 7, further comprising a holster configured to receive said lower portion of said front end.

9. The sensor module of claim 8, wherein said holster includes a pair of curved legs configured to retain said first and second opposing sides of the housing when receiving said lower portion of said front end.

10. The sensor module of claim 1, wherein said IR photodetector comprises a filter configured to reduce sensitivity to ambient light for improving sensor range.

11. The sensor module of claim 1, wherein said housing include a recessed charging port.

12. The sensor module of claim 1, wherein said housing includes power switch configured to toggle the sensor module on and off.

13. The sensor module of claim 1 wherein said IR transmitter and said IR photodetector have a spacing therebetween defining a field of view for said IR ranging circuit.

14. A sensor system comprising:
a sensor module comprising
a housing comprising a front end, a rear end opposing said front end, and first and second opposing sides extending between said front end and said rear end, said front end comprising an upper portion, and a lower portion, said lower portion being recessed with respect to said upper portion,
said housing defining a first opening and a second opening spaced apart from said first opening on said front end,
an inertial measurement unit (IMU) sensor carried by the housing,
a wireless transmitter carried by the housing,
a battery power supply carried by the housing, and
an infrared (IR) ranging circuit configured to sense range information for a target and comprising an IR transmitter aligned with the first opening and configured to emit an IR pulse, and an IR photodetector aligned with the second opening and configured to detect a reflected IR pulse,
said wireless transmitter configured to transmit the range information to a remote location; and
a holster configured to receive said lower portion of said front end of said sensor module.

15. The sensor system of claim 14, wherein said IR ranging circuit is configured to determine the range information based upon time of flight calculations.

16. The sensor system of claim 14, wherein said IMU sensor is configured to provide 3-axis gyroscope values and 3-axis acceleration values; and wherein said IR ranging circuit cooperates with said IMU sensor to provide the range information to define 7 degrees of freedom in motion analysis.

17. The sensor module of claim 14, wherein said holster includes a pair of curved legs configured to retain said first and second opposing sides of the housing when receiving said lower portion of said front end.

18. A method for making a sensor module comprising:
forming a housing comprising a front end, a rear end opposing the front end, and first and second opposing sides extending between the front end and the rear end;
the housing defining a first opening and a second opening spaced apart from the first opening on the front end;
coupling an inertial measurement unit (IMU) sensor to be carried by the housing;
coupling a wireless transmitter to be carried by the housing;
coupling a battery power supply to be carried by the housing; and
positioning an infrared (IR) ranging circuit to sense range information for a target and comprising an IR transmitter aligned with the first opening and configured to emit an IR pulse, and an IR photodetector aligned with the second opening and configured to detect a reflected IR pulse;
the wireless transmitter configured to transmit the range information to a remote location.

19. The method of claim 18, wherein the IR ranging circuit is configured to determine the range information based upon time of flight calculations.

20. The method of claim 18, wherein the IMU sensor is configured to provide 3-axis gyroscope values and 3-axis acceleration values; and wherein the IR ranging circuit cooperates with the IMU sensor to provide the range information to define 7 degrees of freedom in motion analysis.

* * * * *